Oct. 30, 1951 C. H. JORGENSEN ET AL 2,572,865
ENGINE PRESSURE REGULATOR
Filed May 4, 1946 7 Sheets-Sheet 5

INVENTORS
Clarence H. Jorgensen and Lawrence C. Dermond
BY
Spencer Hardman & Fehr
their ATTORNEYS Oct. 30, 1951 C. H. JORGENSEN ET AL 2,572,865
ENGINE PRESSURE REGULATOR
Filed May 4, 1946 7 Sheets-Sheet 7

INVENTORS
Clarence H. Jorgensen and Lawrence C. Dermond
BY
Spencer Hardman & Fehr
their ATTORNEYS Patented Oct. 30, 1951

2,572,865

UNITED STATES PATENT OFFICE 2,572,865

ENGINE PRESSURE REGULATOR

Clarence H. Jorgensen and Lawrence C. Dermond, Rochester, N. Y., assignors to General Motors Corporation, Detroit, Mich., a corporation of Delaware Application May 4, 1946, Serial No. 667,442

11 Claims. (Cl. 123—103)

1

This invention relates to a pressure regulator for a supercharged internal combustion engine for airplane use.

An object of the invention is to provide for manual control of intake pressure selection according to a normal schedule suitable for use during operation of an auxiliary supercharger at relatively low speed (hereinafter termed low blower operation) in combination with means for automatically modifying the schedule in order to obtain a pressure schedule suitable for use during operation of the supercharger at relatively high speed (hereinafter termed high blower operation) and with means for limiting the intake pressures to values such that the engine will not detonate when liquid injection is not used and with means for automatically nullifying the limiting means when liquid injection is used.

Further objects and advantages of the present invention will be apparent from the following description, reference being had to the accompanying drawings wherein preferred embodiments of the present invention are clearly shown.

2

Figures 7, 8, 9:
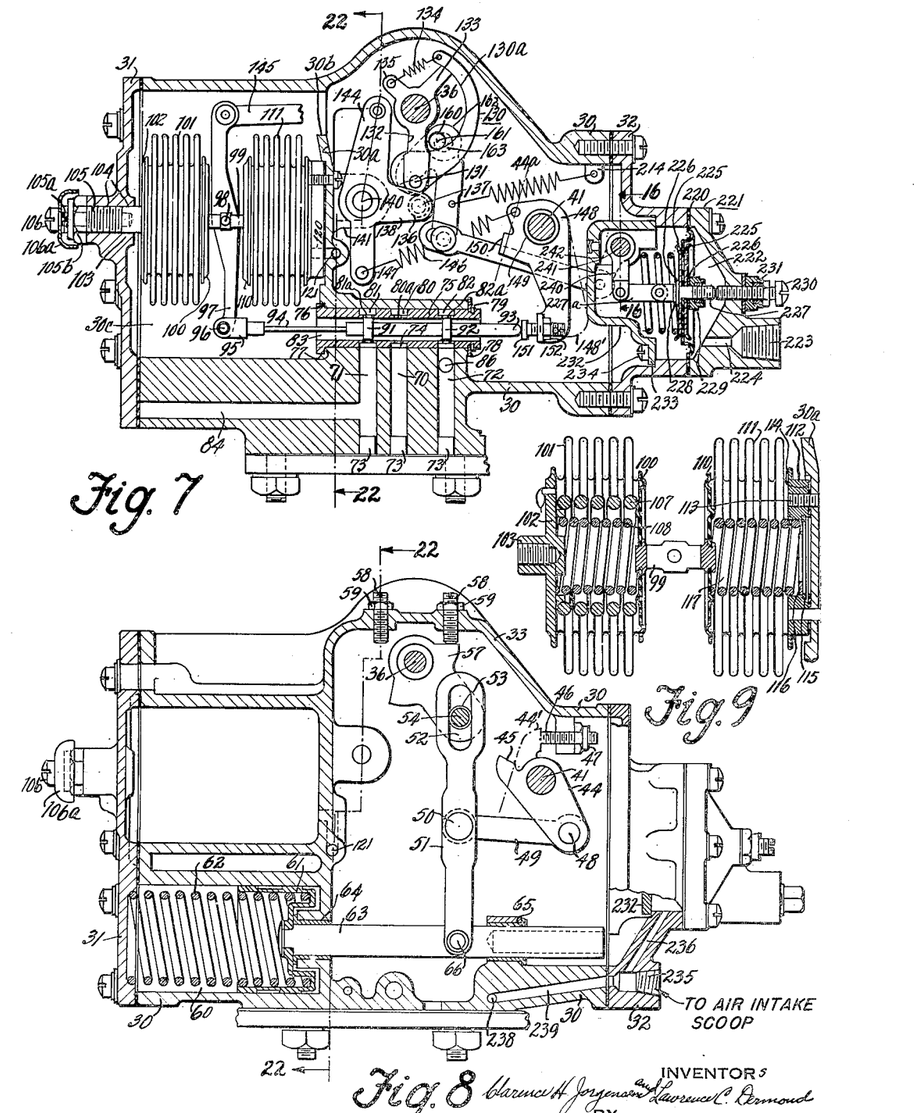
Fig. 7 is a sectional view on lines 7—7 of Figs. 2 and 5.
Fig. 8 is a sectional view on lines 8—8 of Figs. 2 and 5.
Fig. 9 is a longitudinal sectional view of the tandem bellows shown in Fig. 7, and is drawn to a larger scale.

Referring to the drawings, the regulator housing 30 provides an opening at its left end, Fig. 7, closed by a plate 31, opening in its right end closed by a plate 32 and parts supported thereby, and an opening in its left side (Fig. 10) closed by a plate 33. Housing 30 and plate 33 support, respectively, bearings 34 and 35 for a main control shaft 36 which is operated by the pilot through means connected with a lever, not shown, attached to the shaft 36. Since the shaft 36 is operated to select pressures to be maintained, the pressures corresponding to various positions of the shaft are indicated by dial 38 (Fig. 1) supported by plate 33 and indicated by a pointer 39 attached to the shaft 36 as shown in Fig. 10.

Figures 1, 3:
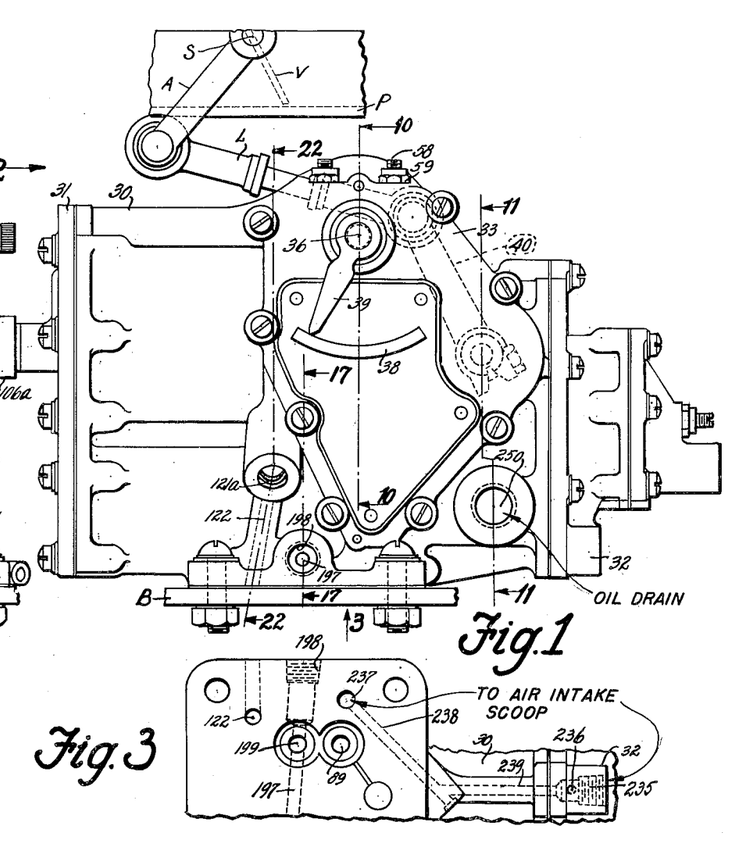
Fig. 1 is a side view of the control embodying the present invention.
Fig. 3 is a fragmentary bottom view in the direction of arrow 3 of Fig. 1.
Figure 2:
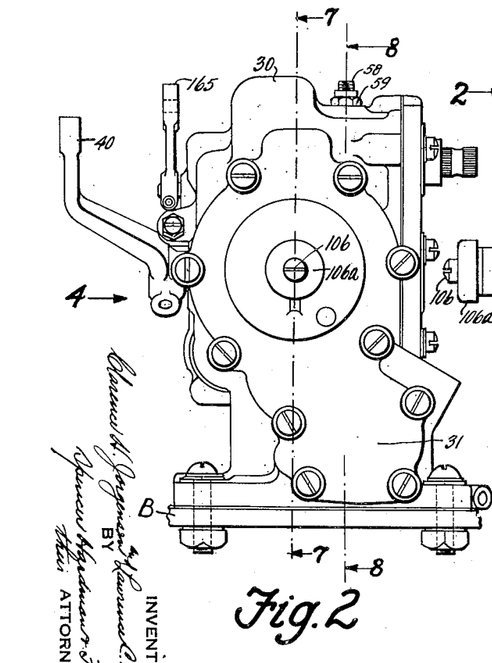
Fig. 2 is an end view in the direction of arrow 2 of Fig. 1.
Figures 4, 5, 6:
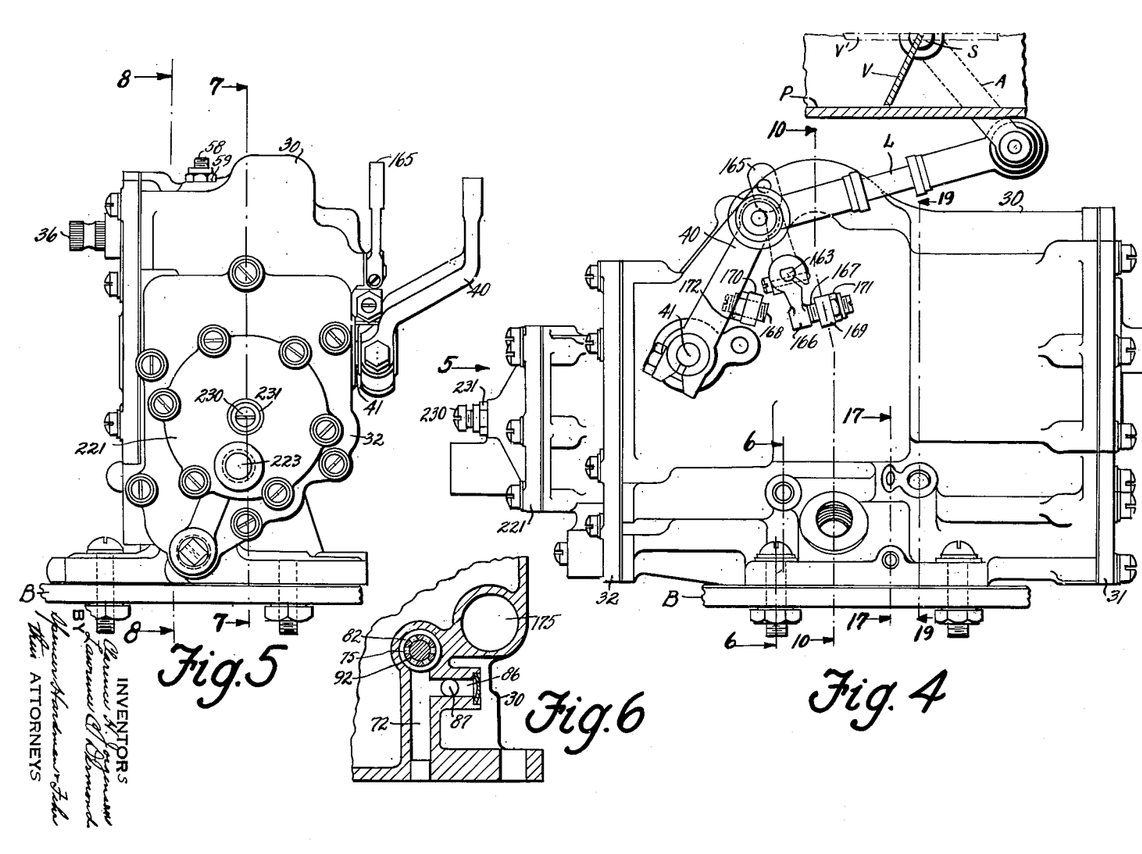
Fig. 4 is a side view in the direction of arrow 4 of Fig. 2.
Fig. 5 is an end view in the direction of arrow 5 of Fig. 4.
Fig. 6 is a sectional view on line 6—6 of Fig. 4.

Shaft 36 is operated also to control the engine throttle valve V, Figs. 1 and 4. Valve V is a butterfly valve located in a pipe P connected with the engine intake. Valve V is supported by a shaft S connected with a lever arm A which is connected by an adjustable link L with a throttle operating lever 40, Figs. 4 and 5. Lever 40 is supported by shaft 41 journalled in bearings 42 and 43 (Fig. 11) supported respectively by housing 30 and cover 33. To the shaft 41 there is fixed an arm 44 (Fig. 8) having a lug 45 for engagement with a stop screw 46 supported by the housing 30 and locked in adjusted position by a self-locking nut 47. Screw 46 limits movement of arm 44 to that required for full opening of the throttle V as indicated by V' in Fig. 4.

Figures 10, 11, 12, 13, 14, 15, 16, 17, 18:
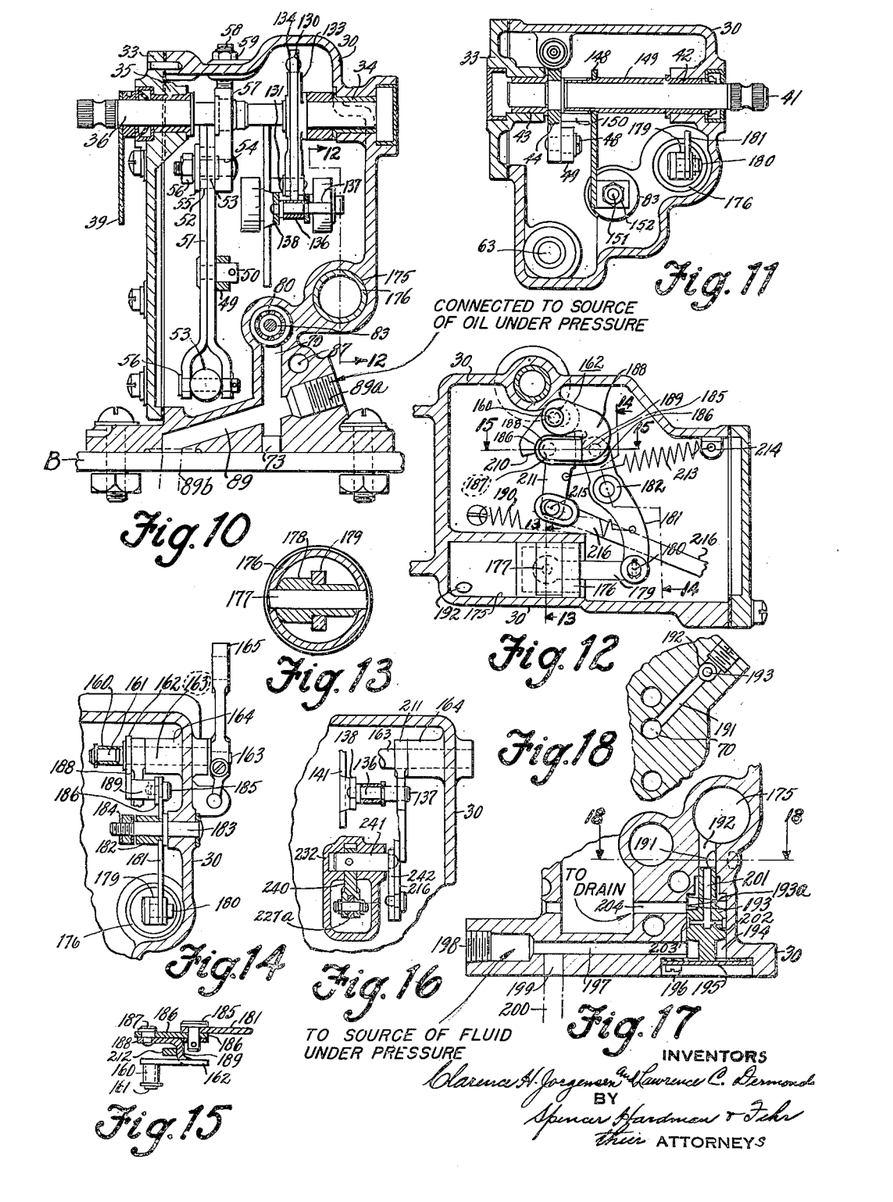
Fig. 10 is a sectional view on lines 10—10 of Figs. 1 and 4.
Fig. 11 is a sectional view on line 11—11 of Fig. 1.
Fig. 12 is a sectional view on line 12—12 of Fig. 10.
Fig. 13 is a sectional view on line 13—13 of Fig. 12 and is drawn to a larger scale.
Fig. 14 is a sectional view on line 14—14 of Fig. 12.
Fig. 15 is a sectional view on line 15—15 of Fig. 12.
Fig. 16 is a sectional view on line 16—16 of Fig. 7.
Fig. 17 is a sectional view on line 17—17 of Fig. 1.
Fig. 18 is a sectional view on line 18—18 of Fig. 17.

Arm 44 carries a stud 48 providing pivotal connection with a link 49 which is connected by a stud 50 with a floating lever 51 which is shown in Fig. 10 and is made of two metal stampings welded together. Lever 51 provides a slot 52 for receiving a roller 53 mounted on a stud 54 and retained by washer 55, Fig. 10, and a nut 56 threaded on stud 54. Stud 54 is carried by an arm 57 attached to shaft 36 and engageable with either of two stop screws 58 locked in adjusted position by lock nuts 59. Screws 58 limit the movement of lever 57 to a predetermined range. It is apparent that rotation of shaft 36 will effect movements of lever 51, link 49, lever 44, shaft 41, arm 40, link L, arm A and valve V.

Lever 51 is operated also by a servo motor comprising a cylinder 60, a piston 61 within the cylinder and urged normally toward the right, Fig. 8, by a spring 62 located between the piston 61 and the plate 31. Piston 61 is connected with a piston rod 63 guided by bearings 64 and 65 provided by the housing 30. Rod 63 is connected with lever 51 by a pin 66.

Figure 23:
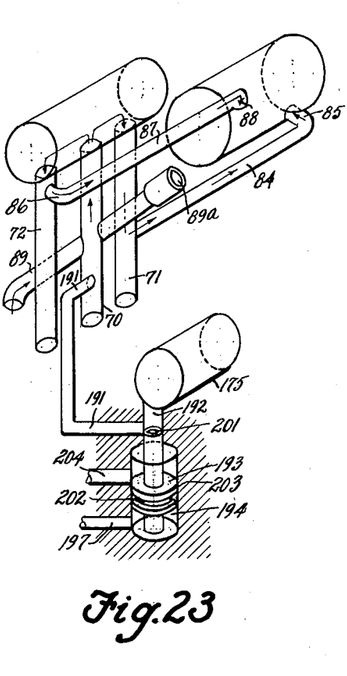
Fig. 23 is a diagram of connections with one of the servo cylinders.

Referring to Fig. 7, housing 30 provides three parallel vertical passages 70, 71 and 72 closed at their lower ends by plugs 73 and opening at their upper ends into a horizontal bore 74 provided for the reception of a valve guide 75 having annular grooves 80, 81 and 82 registering, respectively, with passages 70, 71 and 72. Guide 75 provides a shoulder 76 engaging a recess 77 of the housing 30. Shoulder 76 is yieldingly retained within the recess 77 by a spring washer 78 retained by a snap ring 79 fitted into a groove provided by the valve guide 75. As shown in Figs. 7 and 10, the grooves 80, 81 and 82 are connected respectively with an internal bore 83 of the valve guide groups of radial ports (six in each group) marked respectively, 80a, 81a and 82a. The ports 81a and 82a are controlled respectively by the lands 91 and 92 of a valve 93 received by the bore 83. Valve 93 controls the flow of pressure while entering through passage 70 to either of the passages 71 or 72. Passage 71 is connected, as shown diagrammatically in Fig. 23, by passages 84 and 85 with the right end of the cylinder or with the left end of the cylinder, as shown in Fig. 8. Passage 72 is connected by passages 86, 87 and 88 (Fig. 23) with the left end of the cylinder or with the right end as shown in Fig. 8. Passage 70, Figs. 7 and 10, is connected with a cross passage 89 to which a connection with oil pressure can be made in one of two ways, namely, by a pipe connected with a threaded opening 89a or by a passage indicated in dot and dash lines 89b provided in a suitable mounting pad not shown. If such mounting pad is used, the opening 89a would be plugged. If such mounting pad is not used, the lower end of the passage 89a would be plugged by the bracket B to which the regulator is attached.

Referring to Fig. 7, the portion of the housing to the left of the partition 30a provides a chamber for receiving oil discharged from the left end of cylinder 60, Fig. 8, when piston 61 moves left, thereby forcing the oil from the left end of cylinder 60 out through the passages 84 and 71 and through the left end of bore 83 of guide 75. While the engine is operating the oil will rise to the level of the top surface 30b of partition 30a and flow toward the bottom of that portion of the housing 30 to the right of partition 30a. That portion is connected as shown in Fig. 1 with a drain pipe connected with a tapped opening 250. The discharge of the right end of cylinder 60 when piston 61 moves right through passages 88, 87, 86 and 72 out through the right end of the bore 83 of guide 75 is received by that portion of the housing to the right of partition 30a. When the engine stops and engine lubricating oil ceases to flow into the regulator, the oil accumulated in chamber 30c drains to chamber 30d through a small passage 30e, Fig. 20.

Valve 93 is attached by a flexible rod 94 to a clevis 95 connected by a pin 96 with a lever 97 pivoted at 98 on a bridge 99 connecting the adjacent movable plates 100 and 110 of bellows 101 and 111 respectively. Bellows 101 is connected with a fixed plate 102 having its central boss 103 received by a hole 104 provided by plate 31, Fig. 7. Hole 104 is screw-threaded to receive a tubular screw 105 providing a screw-driver slot 105a. The position of the right end of screw 105 determines the position of the boss 103 and hence the position of the left plate 102 of the bellows 101. The boss 103 is maintained against the right end of screw 105 by a screw 106 which passes through a plain hole in the screw 105 and which threadedly engages a central hole tapped in the boss 103. Screw 106 retains a cap 106a providing access to the screw 105. If screw 106 is removed cap 106a may be removed to permit adjustment of screw 105 which is retained in the desired position of adjustment by a self-locking nut 105b.

Bellows 101 is evacuated and its collapsing is resisted by springs 107 and 108 located between the ends 100 and 102. Bellows 111 is attached to a fixed ring 112, attached by screws, such as 113, to a wall 30a of housing 30 and sealed thereto by a gasket 114. Ring 112 is provided with an internal annular groove for receiving a snap ring 115 which retains a washer 116 providing a seat for a spring 117 confined between plate 110 and ring 112. Bellows 111 is responsive to engine intake pressure. Since bellows 111 and 101 have the same area and number of convolutions, the movement of the bridge 99 is controlled only by the pressure in the bellows 111. The springs 107, 108 and 117 are so constructed and calibrated that the relation of positions of bridge 99 to pressures within the bellows 111 is substantially a linear relation. Bellows 111 is placed in communication with the engine intake through a passage 120 extending through the ring 112, gasket 114 and the partition 30a and connected with a passage 121, Fig. 22, which may be placed in communication with the engine intake in either of two ways namely, by a pipe, not shown, connected by a fitting which screws into a threaded opening 121a or by a cross passage 122 which would be aligned with an opening 123, indicated by dot and dash lines if a mounting pad for the regulator were provided with such a passage connected with the engine intake. If such a mounting pad were not used, the passage 122 would be blocked by a mounting bracket, and passage 121 would be connected with a pipe having a fitting screwed into the threaded opening 121a.

Figures 19, 20, 21, 22:
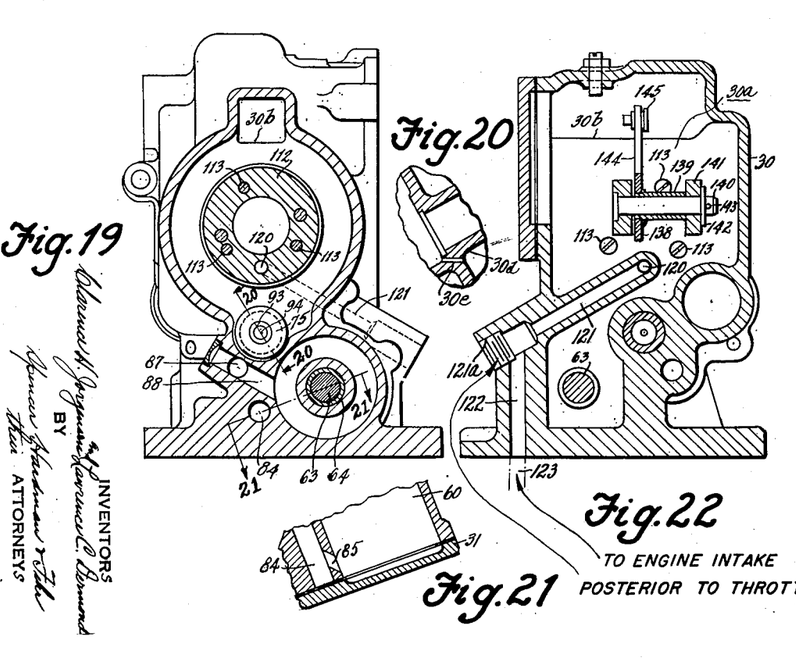
Fig. 19 is a sectional view on line 19—19 of Fig. 4.
Fig. 20 is a fragmentary sectional view on line 20—20 of Fig. 19.
Fig. 21 is a fragmentary sectional view on line 21—21 of Fig. 19.
Fig. 22 is a sectional view on lines 22—22 of Figs. 1, 7 and 8.

The valve controlling lever 97 is positioned by the bridge 99 and also by a pressure selecting cam 130, Fig. 7, pivoted on a pin 131 carried by an arm 132 attached to the main control shaft 36 and providing a strut 133 against which the cam 130 is urged by a spring 134 connecting the cam with a lug 135 of the arm 132. Normally the cam 130 engages the strut 133. Cam 130 cooperates with a cam follower roller 136 mounted on a stud 137 supported by a lever arm 138 which, as shown in Fig. 22, is attached to a hub sleeve 139 journalled on a rod 140 supported by brackets 141, integral with partition 30a of housing 30. Rod 140 is retained by a washer 142 and a pin 143. Arm 138 is integral with an arm 144 connected by a link 145 with lever 97. Arm 138 is urged counterclockwise, Fig. 7, by a spring 146 connecting an arm 147 integral with arm 138 with a lever 148 which, as shown in Fig. 11, is attached to a hub sleeve 149 journalled on shaft 41. Therefore, spring 146 urges lever 148 counterclockwise (Fig 7) so that its normal position is that indicated by dot and dash lines 148', motion of the lever toward the right being limited due to its engagement with a housing member 232 to be described. Lever 148 is moved into the position shown in full lines in Fig. 7, when arm 44, Fig. 8, is moved into the dot and dash line position 44' which is its position when the throttle valve is fully opened. As arm 44 moves clockwise toward the position 44', its left hand edge indicated by line 44a, Fig. 7, engages a lug 150 provided by arm 148. Therefore arm 148 will be located in the position shown in full lines in Fig. 7 when arm 44 is in the dot and dash line position 44' (Fig. 8) corresponding to which position the throttle valve is fully opened. Therefore when the throttle valve is fully opened, arm 148 is in such position as to cause movement of the valve 93 to the equilibrium position shown in Fig. 7, said movement of valve 93 being effected by the engagement of its right end by a screw 151 supported by lever 148 and secured thereto by lock nut 152. Therefore the servomotor is hydraulically stopped in the wide open throttle position, and cannot move the valve V past the position V' (Fig. 4).

Figures 24, 29:
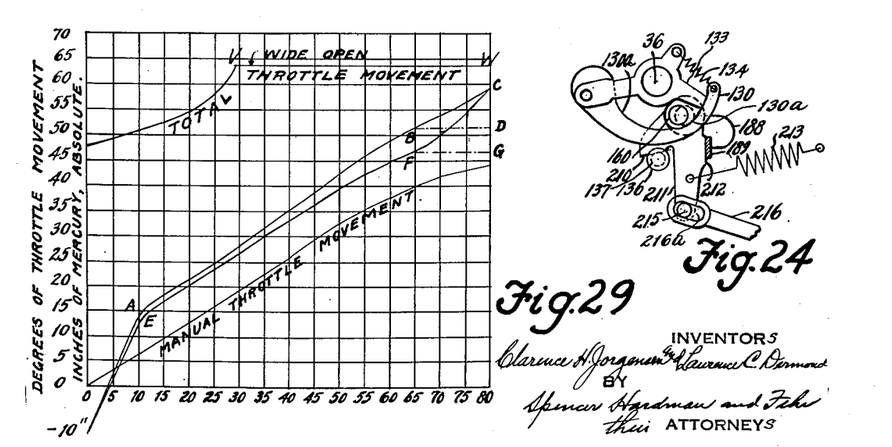
Figs. 24 through 28 are diagrams and Fig. 29 is a chart showing the operation of the regulator.

The control of the throttle valve by shaft 36 alone is such as to obtain intake pressures sufficient for ascent from sea level or for a safe landing in case of failure of the throttle servo. In the event of failure of oil pressure in cylinder 60, the spring 62 returns the piston 61 to the right of position, Fig. 8, thereby allowing a safe landing to be made through control of the throttle by shaft 36. The throttle is opened manually through the shaft 36 an amount less than required to maintain a selected pressure. The opening required to maintain selected pressure is effected by further opening of the throttle by the throttle servo as altitude increases. A greater throttle opening is required in order to maintain a selected pressure. For all pressure selections within the operating range, the throttle servo adds whatever opening movement of the throttle is required to maintain the selected pressure up to critical altitude. At critical altitude for all selected pressures within the operating range, the throttle is substantially wide open (as indicated by line V—W in Fig. 29). When the pressure selection is that required for minimum cruise, practically a full stroke of the servo piston 61 toward the left is required to open the throttle wide open. Since movement of the cam 130 clockwise to select pressures higher than required for minimum cruise is accompanied by manually effected opening of the throttle valve, less than full stroke of the piston 61 will be required to move the throttle valve to fully open position at critical altitudes. The amount of the stroke of the piston required fully to open the throttle is determined by the movement of the valve 93 to equilibrium position as effected by lever 44 which moves lever 148 which moves stop screw 151 which locates the valve 93 in equilibrium position as shown in Fig. 7, thus providing an hydraulic stop or lock. If the piston 61 were not hydraulically locked it would tend to change the position of shaft 36 although shaft 41 is blocked clockwise by the stop screw 46.

The cam 130 selects pressures according to a predetermined schedule of pressure positions of shaft 36 as shown in Fig. 1. The positions of shaft 36 and corresponding manifold pressures are indicated on the dial 38. These are the pressures which are obtained so long as the cam 130 engages the strut 133, Fig. 7. Under certain conditions, as will be explained, it is desirable to modify this schedule. This is obtained by moving the cam 130 about the pivot 131. For example, if the cam 130 is moved into the position 130' (Fig. 25) wherein it is separated from strut 133, the normal schedule will be modified, that is, the schedule will be that represented by lines E—F—C, Fig. 9, instead of the normal schedule A—B—C. Cam 130 is provided with an auxiliary cam surface 130a normally out of engagement with a roller 160 in all positions of the cam 130 from zero to the 80° position shown in Fig. 24. However, when the roller 160 is moved into the position 160' (Fig. 25) cam surface 130a is engaged by roller 160 and cam 130 is variably positioned away from the strut 133 depending on the contour of surface 130a; thus, modified schedule according to line E—F—C or any other line below A—B—C may be obtained. Roller 160 is rotatable on a pin 161 (Fig. 14) which is supported by a plate 162 attached to a shaft 163 journalled in a tubular boss 164 provided by housing 30. The pin 161 is eccentric to the axis of the shaft 163. The shaft 163 may be operated in one of two ways, namely, by a lever 165 attached thereto or by means operatively connected with the plate 162. In either case, rotation of the shaft 163 is limited by the engagement of an arm 166 (Fig. 4) of lever 165 with either of two adjustable stop screws 167 and 168 supported by lugs 169 and 170 integral with housing 30 and fixed in adjusted position by self-locking nuts 171 and 172. If the shaft 163 is not manually operated through the lever 165, it is automatically operated by a servo-motor comprising a cylinder 175 (Fig. 12) provided by housing 30 and receiving a piston 176 carrying a wrist pin 177 for receiving a hub 178 of a link 179 (Fig. 13), connected by pin 180 with a lever 181 having a hub 182 (Fig. 14) journalled on a stud 183 carried by housing 30 and retained by a self-locking nut 184 threaded on the stud 183. A pin 185 (Fig. 15) pivotally connects lever 181 with a link 186 connected by a stud 187 with an arm 188 integral with an offset portion 189 connecting arm 188 with plate 162. A spring 190 (Fig. 12), which connects lever 181 with housing 30, urges the piston 176 left and lever 181 clockwise, lever 181 being held in the position shown in Fig. 12 so long as pressure fluid occupies the cylinder 175. This pressure fluid is the same as that which actuates the throttle servo.

Referring to Fig. 18, passage 70, which is connected with a pressure oil source, is also connected by passage 191 with a passage 192 (Fig. 17) leading, to the left end of cylinder 175 (Fig. 12). The connection between passages 191 and 192 is controlled by a piston valve 193 received by a cylinder 194 provided by housing 30 (Fig. 17). The valve 193 is normally held down against a retainer plate 195 (attached by screws 196 to housing 30) by a spring 193a. When it is desired to raise the valve 193, pressure fluid is admitted to the lower end of cylinder 194 through a passage 197 which is connected with a fluid pressure source in either of two ways, namely, a pipe connected by a coupling threaded into the tapped hole 198 or through a side passage 199 communicating with a passage 200 provided by a mounting pad, not shown. When pressure fluid is admitted to the lower end of cylinder 194 sufficient to overbalance the pressure upon the valve 193 exerted by spring 193a and oil pressure above, the valve 193 is lifted so that its upper end blocks the passage 191 and passage 192 is connected with drain through a central bore 201 in valve 193, side passages 202, groove 203 and passage 204 leading to drain through the interior of the housing. The admission of pressure fluid through the passage 197 may be controlled in any manner and for any purpose. For example, when the transmission between the engine and the auxiliary blower is shifted into high gear, a valve is opened to cause pressure fluid to flow through pipe 197. Therefore, the regulator provides for coordinating the shift into high blower with a modification of the pressure selection to obtain the schedule represented by line E—F—C.

Figure 27:
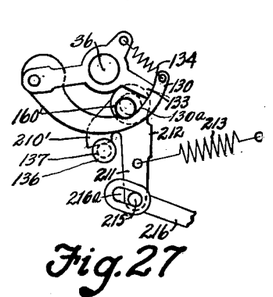

The full normal schedule A—B—C and the full modified schedule E—F—C are obtained only when liquid-injection is used to cool the fuel mixture so as to avoid detonation. Except at C, the pressure values on schedule E—F—C are lower than those on schedule A—B—C. Since high blower operation increases the temperatures of the fuel-air mixture, it is necessary to lower the pressure selections in order to avoid detonation. As the pressure range F—C is used in emergency for ascent to high altitude when outside air temperature is relatively low, it is possible to increase pressure selection to C without detonation. Up to the 65° position of cam 130, the portion A—B of the normal schedule and the portion E—F of the modified schedule are obtained regardless of absence of liquid-injection. From the 65° to the 80° position of cam 130, the normal schedule is B—D and the modified schedule is F—G. The limitation of the pressure obtainable without liquid-injection is effected by a cam-follower limiting stop lug 210, (Figs. 12 and 24) provided by a lever 211 which is loosely journalled on shaft 163 and having a stop surface 212 normally engaged by the offset 189 of the arm 188 which extends from plate 162 (Figs. 14 and 15). A spring 213 (Fig. 12), connecting lever 211 with an eye 214 attached to housing 30, urges lever 211 against the offset 189 which cannot move from the positions shown in Figs. 12 and 24 since it is held in that position by the fluid pressure to the left of piston 176. In the position of lever 211 shown in Figs. 12 and 24, the stop lug 210 engages the cam follower roller pin 137 after cam 130 leaves the 65° position when moving toward the 80° position, shown in Fig. 24. Therefore the highest normal pressure selection without liquid-injection is B (for example about 52" Hg). In case of high-blower operation without liquid-injection, movement of piston 176 to 176' (Fig. 25) causes arm 188 and its offset 189 to move to 188' and 189; thereby freeing lever 211 which is moved to position 211' by spring 213, said movement being arrested by the engagement of a pin 215 on lever 211 with the right end wall of a slot 216a of a link 216 used for a purpose to be described. Stop 210 is located at 210' in Figs. 25, 26 and 27. From the zero position of cam 130 (at 130') in Fig. 25 to the 65° of the cam in Fig. 26, the roller 136 follows the cam. From the 65° position to the 80° position of the cam 130 (wherein it returns to the strut 133 in Fig. 27), the stop 210 (at 210') engages the pin 137 and prevents the roller 136 from following the cam 130. Therefore the highest obtainable pressure of the modified schedule is F or about 47" Hg. Without liquid-injection, the modified pressure schedule for high blower operation is F—G between the 65° and the 80° positions of cam 130. Therefore detonation of the engine is prevented when liquid-injection is not present.

When liquid-injection is present the stop lug 210 is moved clockwise away from the roller pin 137 so that the regulator may operate according to the full normal schedule A—B—C for low blower operation and the full modified schedule E—F—C for high blower operation. The retraction of stop lug 210 is effected automatically by the movement of a diaphragm 220 from the position shown in Fig. 25 to the position shown at 220' in Fig. 28. The periphery of the diaphragm 220 is clamped between the plate 32 and a plate cover 221 which provides, together with the diaphragm, a liquid chamber 222 to be connected with a source of liquid injection fluid under pressure through a pipe connected with the tapped hole 223 and passage 224. The central portion of the diaphragm 220 is located between the washers 225 which are located between washers 226. A rod 227 having a shoulder 228 passes through the washers and diaphragm and threadedly engages a self-locking nut 229 thereby clamping the diaphragm and washers against the shoulder 228. Rod 227 provides a diaphragm stop which engages a stop screw 230 threaded through the cover 221 and secured in adjusted position by a self-locking nut 231. The rod 227 may be urged toward the screw 230 by spring 220b alone or by spring 220b plus the fluid pressure at the left of the diaphragm, said fluid pressure being confined within a chamber provided by the diaphragm, the plate 32 and a cover 232 clamped against a shoulder 233 of plate 32 by screws 234. The space to the left of diaphragm 220 may be placed in communication with a fluid pressure source such as the engine air scoop or other part which is subjected to ram pressure by a pipe connected with the tapped opening 235, (Fig. 8), in plate 32 and connected by a passage 236 with the space between the cover 232 and the diaphragm 220; or the opening 235 may be plugged and the air scoop may be connected with said space through a duct in a mounting pad communicating with hole 237 (Fig. 3) connected by passages 238 and 239 with passage 236.

Figures 25, 26:
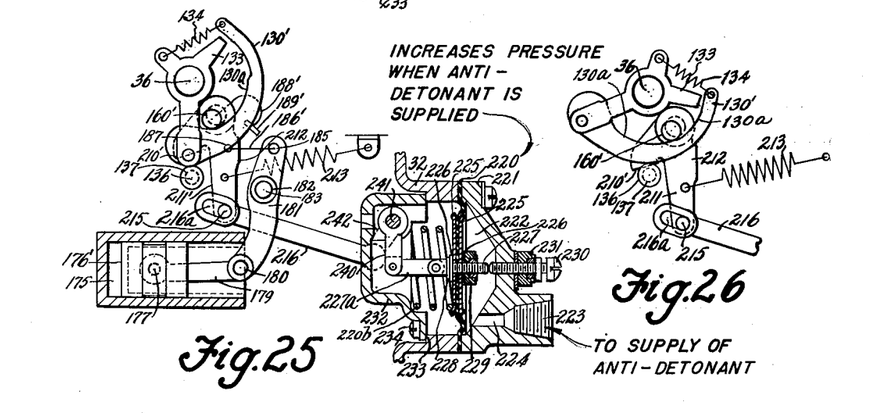
Figure 28:
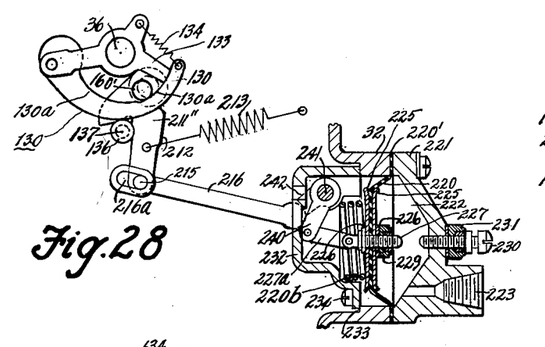

When liquid injection is used during high blower operation, the pressure of the injection-liquid at the right of the diaphragm 220 overcomes spring 220b (and also ram pressure at the left of the diaphragm in case the space at the left of the diaphragm is connected with the air scoop), and the diaphragm moves from the position shown in Fig. 25 to that shown in Fig. 28, thereby causing left movement of rod 227 and link 227a, clockwise movement of lever 240, shaft 241 and lever 242 connected therewith, and left movement of link 216. As link 216 moves left from the position shown in Fig. 25 to that shown in Fig. 28, the right end of its slot 216a presses against the pin 215 of lever 211 to cause said lever to move against the action of spring 213 from the position 211' (Fig. 25) to the position 211" (Fig. 28), thereby retracting the stop lug 210 from engagement with the cam follower roller pin 137, thereby permitting the cam follower roller 136 to follow the cam 110 into any of its positions. When liquid injection is present, in the range of 65° to 80° positions of cam 130, the pressure schedule is B—C for low blower operation and the pressure schedule is F—C for high blower operation. When liquid injection ceases, the schedules in the 65°–80° range automatically become B—D for low blower operation and F—G for high blower operation, since the spring 220b automatically returns the diaphragm 220 to the position shown in Fig. 25, thereby returning the lug 210 to its cam-follower-pin-limiting position.

As stated before, the piston 176, Fig. 12, is held in the position shown for low blower operation by pressure fluid in cylinder 175 which resists the action of spring 190. By relieving the oil pressure in cylinder 175, the spring 190 moves the piston 176 to the position 176' (Fig. 25) for high blower operation. In order to provide for such control of the piston 176, it is necessary to provide the shuttle valve 193 (Fig. 17) which is lifted by pressure fluid in pipe 197 in order to provide for the relief of pressure in cylinder 175. Fluid pressure in pipe 197 exists when high blower operation is called for. The advantage that flows from the use of the shuttle valve 193, is that failure of oil pressure in the cylinder 175 will not result in engine detonation. For example, if at the time of low blower operation, the pressure selection is on line B—D and oil pressure in ducts 70, 191 and 192 (Fig. 18) should fail, the spring 90 will move the piston 176 (Fig. 12) to 176' (Fig. 25) thereby lowering the pressure to F—G. Obviously, if the oil pressure in pipes 70 and 191 drops during high blower operation when duct 191 is blocked by shuttle valve 193 and the cylinder 175 is connected with drain, there will be no change in the position of piston 176 and the pressure selection will still remain on line F—G. The apparatus is therefore safe to use in systems when failure of oil pressure during high blower operation does not automatically effect the return to low blower operation.

Figure 30:
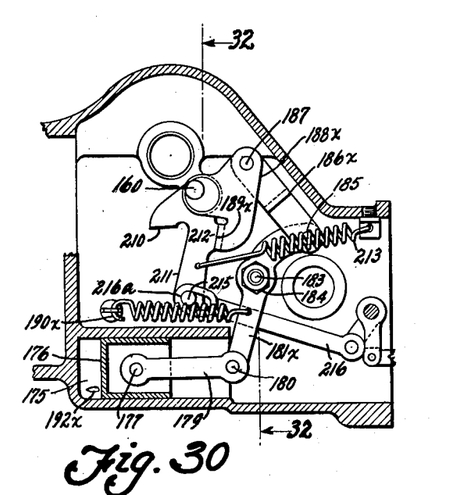
Figs. 30 and 31 are views similar to Figs. 12 and 25 showing a modification.
Figure 31:
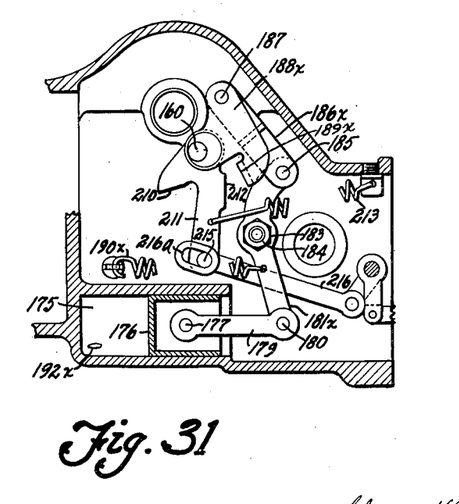
Figure 32:
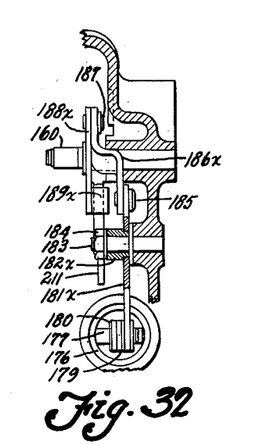
Fig. 32 is a sectional view on line 32—32 of Fig. 30.

However, if the apparatus is to be used in a system wherein failure of oil pressure during high blower operation results in return to low blower operation automatically, the shuttle valve 193 is omitted and the apparatus is simplified as shown in Figs. 20 to 32. The cylinder 175 is connected by duct 192x with the source of oil pressure which is effective to cause the shift from low blower to high blower operation. Therefore, when shifting from low blower to high blower, this oil pressure shifts the piston 176 from the position shown in Fig. 30 to the position shown in Fig. 31. This causes, through the action of link 179, lever 181x, link 186x and lever 188x, the separation of pad 189x from surface 212 of lever 211 thereby permitting lever 211 to move under the action of the spring 213 from the position shown in Fig. 30 for low blower operation to the position shown in Fig. 31 for high blower operation. If the pressure drops in cylinder 175 sufficiently to permit the spring 190x to return the piston 176 to the position shown in Fig. 30 there will be a return to low blower operation so that the pressure selection will change from a value on line E—F—G to a value on line A—B—D which is safe for low blower operation.

While the embodiment of the present invention as herein disclosed constitutes a preferred form, it is understood that other forms might be adopted all coming within the scope of the claims which follow.

What is claimed is as follows:

1. A pressure regulator for supercharged internal combustion engines comprising a device responsive to engine intake pressure, a pressure selecting cam, a cam follower, apparatus under joint control by the device and the cam follower for so adjusting an engine intake throttle valve as to maintain a selected pressure, a main control member for moving the cam into various positions of pressure selections according to a predetermined normal schedule of positions of the control member and pressures, means for effecting, as the cam is moved by the main control member, movement of the cam laterally relative to its direction of movement by the member whereby a modified schedule of pressure selections is obtained and a mechanism for rendering said means operative or non-operative.

2. A pressure regulator for supercharged internal combustion engines comprising a device responsive to engine intake pressure, a pressure selecting cam, a cam follower, apparatus under joint control by the device and the cam follower for so adjusting an engine intake throttle valve as to maintain a selected pressure, a main control member for moving the cam into various positions of pressure selections according to a predetermined normal schedule of positions of the control member and pressures, means for effecting, as the cam is moved by the main control member, movement of the cam laterally relative to its direction of movement by the member whereby a modified schedule of pressure selections is obtained, a mechanism for rendering said means operative or non-operative, a stop member positioned so as to prevent the cam follower from following the cam in the higher pressure selecting range of its movement, and means for retracting the stop member.

3. A pressure regulator for supercharged internal combustion engines comprising a device responsive to engine intake pressure, a pressure selecting cam, a cam follower, apparatus under joint control by the device and the cam follower for so adjusting an engine intake throttle valve as to maintain a selected pressure, a main control member for moving the cam into various positions of pressure selections according to a predetermined normal schedule of positions of the control member and pressures, means for effecting, as the cam is moved by the main control member, movement of the cam laterally relative to its direction of movement by the member whereby a modified schedule of pressure selections is obtained, a mechanism for rendering said means operative or non-operative, a stop member positioned so as to prevent the cam follower from following the cam into certain higher pressure selections of either the normal schedule or of the modified schedule, and means for retracting the stop member.

4. A pressure regulator for supercharged internal combustion engines comprising a device responsive to engine intake pressure, a pressure selecting cam, a cam follower, apparatus under joint control by the device and the cam follower for so adjusting an engine intake throttle valve as to maintain a selected pressure, a main control member for moving the cam into various positions of pressure selections according to a predetermined normal schedule of positions of the control member and pressures, means for effecting, as the cam is moved by the main control member, movement of the cam laterally relative to its direction of movement by the member whereby a modified schedule of pressure selections is obtained, a mechanism for rendering said means operative or non-operative, a stop member normally positioned so as to prevent the cam follower from following the cam into a certain range of high pressure selections of the normal schedule and positioned by the mechanism when set to render said means operative, so as to prevent the cam follower from following the cam into a range of pressure selection of the modified schedule co-extensive with said range of the normal schedule, and means for retracting the stop member from either position.

5. A pressure regulator for supercharged internal combustion engines comprising a device responsive to engine intake pressure, a pressure selecting cam, a cam follower, apparatus under joint control by the device and the cam follower for so adjusting an engine intake throttle valve as to maintain a selected pressure, a main control member for moving the cam into various positions of pressure selections according to a predetermined normal schedule of positions of the control member and pressures, means for effecting, as the cam is moved by the main control member, movement of the cam laterally relative to its direction of movement by the member whereby a modified schedule of pressure selections is obtained, a mechanism for rendering said means operative or non-operative, a stop member normally positioned so as to prevent cam follower from following the cam after the main control member passes a certain position during its movement toward the highest pressure selecting position, and positioned by the mechanism, when set to render said means operative, so as to prevent the cam follower from following the cam after the main control member passes said certain position of its movement, and means for retracting the stop member from either position.

6. A pressure regulator for supercharged internal combustion engines comprising a shaft, a cam bar pivotally supported by the shaft eccentrically thereof, a cam bar stop carried by the shaft, a spring urging the cam bar against the stop, said cam bar having inner and outer cam surfaces, a cam-follower spring-urged into engagement with the outer surface, a device responsive to engine intake pressure, apparatus under joint control of the device and the cam follower for so adjusting an engine intake throttle-valve as to maintain a selected pressure, a main control member for turning the shaft in order to select pressures according to a predetermined normal schedule of positions of the control member and pressures, an element movable into engagement with the inner cam surface of the cam bar to cause it to move about its pivot as the cam shaft is turned thereby modifying the schedule of pressure selections and a mechanism for moving the element into operative or non-operative positions.

7. A pressure regulator for supercharged internal combustion engines comprising, a shaft, a cam bar pivotally supported by the shaft eccentrically thereof, a cam bar stop carried by the shaft, a spring urging the cam bar against the stop, said cam bar having inner and outer cam surfaces, a cam-follower spring-urged into engagement with the outer surface, a device responsive to engine intake pressure, apparatus under joint control of the device and the cam follower for so adjusting an engine intake throttle-valve as to maintain a selected pressure, a main control member for turning the shaft in order to select pressures according to a predetermined normal schedule of positions of the control member and pressures, an element movable into engagement with the inner cam surface of the cam bar to cause it to move about its pivot as the cam shaft is turned thereby modifying the schedule of pressure selections, a mechanism for moving the element into operative or non-operative positions, a stop member for preventing the cam follower from following the cam into position of high pressure selection, and means for retracting the stop member.

8. A pressure regulator for supercharged internal combustion engines comprising a shaft, a cam bar pivotally supported by the shaft eccentrically thereof, a cam bar stop carried by the shaft, a spring urging the cam bar against the stop, said cam bar having inner and outer cam surfaces, a cam-follower spring-urged into engagement with the outer surface, a device responsive to engine intake pressure, apparatus under joint control of the device and the cam follower for so adjusting an engine intake throttle-valve as to maintain a selected pressure, a main control member for turning the shaft in order to select pressures according to a predetermined normal schedule of positions of the control member and pressures, an element movable into engagement with the inner cam surface of the cam bar to cause it to move about its pivot as the cam shaft is turned thereby modifying the schedule of pressure selections, a mechanism for moving the element into operative or non-operative positions, a stop member positioned by the mechanism for preventing the cam follower from following the cam beyond a certain position of its angular movement toward highest selecting position, and means for retracting the stop member from either of its positions.

9. A pressure regulator for supercharged internal combustion engines cmprising, a shaft, a cam bar pivotally supported by the shaft eccentrically thereof, a cam bar stop carried by the shaft, a spring urging the cam bar against the stop, said cam bar having inner and outer cam surfaces, a cam follower, a cam-follower support, a spring urging the cam-follower into engagement with the outer cam surface, a device responsive to engine intake pressure, apparatus under joint control of the device and the cam follower for so adjusting an engine intake throttle-valve as to maintain a selected pressure, a main control member for turning the shaft in order to select pressures according to a predetermined normal schedule of positions of the control member and pressures, a second shaft, a second cam-follower eccentrically supported by the second shaft for engagement with the inner cam surface of the cam-bar, and a mechanism for rotating the second shaft.

10. A pressure regulator for supercharged internal combustion engines comprising, a shaft, a cam bar pivotally supported by the shaft eccentrically thereof, a cam bar stop carried by the shaft, a spring urging the cam bar against the stop, said cam bar having inner and outer cam surfaces, a cam follower, a cam-follower support, a spring urging the cam-follower into engagement with the outer cam surface, a device responsive to engine intake pressure, apparatus under joint control of the device and the cam follower for so adjusting an engine intake throttle-valve as to maintain a selected pressure, a main control member for turning the shaft in order to select pressures according to a predetermined normal schedule of positions of the control member and pressures, a second shaft, a second cam-follower eccentrically supported by the second shaft for engagement with the inner cam surface of the cam-bar, a mechanism for rotating the second shaft, a lever loosely journalled on said shaft and providing a stop for engaging the cam-follower support to prevent the cam-follower from following the cam beyond a certain angular position thereof, means movable with the mechanism for controlling the position of the stop lever, and means for retracting the stop lever for engagement with the cam-follower support in any position of the cam.

11. A pressure regulator for supercharged internal combustion engines comprising a device responsive to engine intake pressure, a pressure selecting means, apparatus under joint control by the means and by the device for positioning an engine intake throttle valve in order to maintain a selected pressure, a control member for moving the pressure selecting means to obtain a certain normal schedule of pressures corresponding to positions of said member, means for modifying the pressure selecting means to obtain a different schedule of pressures, means for limiting the pressures obtainable to values on either schedule corresponding to substantially the same position of the control member, and means for rendering the limiting means inoperative.

CLARENCE H. JORGENSEN.
LAWRENCE C. DERMOND.

REFERENCES CITED

The following references are of record in the file of this patent:

UNITED STATES PATENTS

| Number | Name | Date |
| --- | --- | --- |
| 2,217,364 | Halford et al. | Oct. 8, 1940 |